US008127881B2

(12) United States Patent
Shakory-Tabrizi

(10) Patent No.: US 8,127,881 B2
(45) Date of Patent: Mar. 6, 2012

(54) ARRANGEMENT OF A HEADLAMP SHELL, A SENSOR AND A PROTECTIVE PLATE FOR THE SENSOR IN A VEHICLE

(75) Inventor: Reza Shakory-Tabrizi, Markgroeningen (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 388 days.

(21) Appl. No.: 12/538,447

(22) Filed: Aug. 10, 2009

(65) Prior Publication Data

US 2010/0120317 A1 May 13, 2010

(30) Foreign Application Priority Data

Nov. 7, 2008 (DE) .......................... 10 2008 057 432

(51) Int. Cl.
*B60K 28/10* (2006.01)
(52) U.S. Cl. ....................................... 180/274; 362/507
(58) Field of Classification Search .................. 180/274; 280/734, 735; 296/187.03, 187.09, 193.09, 296/198; 362/507
See application file for complete search history.

(56) References Cited

FOREIGN PATENT DOCUMENTS

DE 10 2004 050 674 4/2006

*Primary Examiner* — Paul N Dickson
*Assistant Examiner* — Robert A Coker
(74) *Attorney, Agent, or Firm* — Gerald E. Hespos; Michael J. Porco

(57) ABSTRACT

A sensor mounting arrangement for a vehicle has a headlamp shell (5) with a recess (14) and a hole (16) spaced from the recess (14). A protective plate (11) has a projection (15) that protrudes into the recess (14) of the headlamp shell (5). A blind rivet bolt (18) is riveted to the protective plate (11) at a location spaced from the projection (15) of the protective plate (11). The blind rivet bolt (18) has a bolt head (17) that passes through the hole (16) in the headlamp shell (5). A crash sensor (19) is connected firmly to the blind rivet bolt (18) and hence to the protective plate (11). The connection ensures that forces generated in the event of a crash will not cause the protective plate (5) to shear off the headlamp shell (5) before the sensor (19) has time to respond.

14 Claims, 4 Drawing Sheets

ARRANGEMENT OF A HEADLAMP SHELL, A SENSOR AND A PROTECTIVE PLATE FOR THE SENSOR IN A VEHICLE

CROSS-REFERENCE TO RELATED APPLICATIONS

This application claims priority under 35 USC 119 to German Patent Application No. 10 2008 057 432.5 filed on Nov. 7, 2008, the entire disclosure of which is incorporated herein by reference.

BACKGROUND OF THE INVENTION

1. Field of the Invention

The invention relates to an arrangement of a headlamp shell, a sensor and a protective plate for the sensor in a vehicle.

2. Description of the Related Art

Sensors, especially movement, pressure and temperature sensors, for example crash sensors, are used in vehicles in a variety of ways. The sensors are fit in the area of a headlamp shell of the vehicle, for example a passenger car. A crash sensor is used, for example, to trigger an airbag in the event of a crash.

DE 10 2004 050 674 A1 describes a fastening arrangement for a sensor in a vehicle. The sensor has a housing with a fixing pin and a coding pin, as well as a hole for receiving a fastening bolt. A body panel of the vehicle has a trough with two holes and a bore. The holes receive the fixing pin and the coding pin. A nut is welded to the body panel at the bore so that the fastening bolt can be connected to the nut. The fixing pin and the coding pin are inserted into the holes in the body panel so that the housing is positioned precisely in relation to the body panel. The housing then can be connected firmly to the body panel merely by attaching the fastening bolt.

An object of the invention is to create an arrangement of the headlamp shell, sensor and protective plate for the sensor in the vehicle to ensure that shear forces introduced into the connection between the protective plate and the headlamp shell in the event of a crash will not shear off the protective plate and the headlamp shell before the sensor has time to respond.

SUMMARY OF THE INVENTION

The invention relates to an arrangement of a headlamp shell, a sensor and a protective plate for the sensor in a vehicle. The arrangement is characterized in that the protective plate is connected firmly to the sensor and to the headlamp shell. At least one connection between the sensor and the protective plate preferably is a blind rivet bolt with a bolt head that passes through a hole in the headlamp shell. The protective plate may protrude with a projection into a recess in the headlamp shell at an interval from the blind rivet bolt. Alternatively, the headlamp shell may protrude with a projection into a recess in the protective plate at an interval from the blind rivet bolt.

The arrangement of the invention provides a firm connection between the protective plate and the headlamp shell and also provides elements that positively interlock when shear forces act between the protective plate and the headlamp shell, particularly in the event of a crash. The bolt head of the blind rivet bolt that passes through the hole in the headlamp shell is in contact with the edge of the hole in the headlamp shell. Thus, the bolt head prevents displacement of the protective plate and the headlamp shell towards one another despite an introduction of shear forces between the protective plate and the headlamp shell in the event of a crash. The positive interlock between the projection on the protective plate and the recess in the headlamp shell or between the projection on the headlamp shell and the recess in the protective plate also limits shear movement of the protective plate and the headlamp shell. In the event of a crash, the firm connections between the protective plate and the headlamp shell and the positive interlocking connections in the area of the blind rivet bolt and the hole in the headlamp shell, and of the projection and the recess ensure that the connection between the protective plate and the headlamp shell holds, at least at the beginning of the crash sequence, thereby ensuring that the sensor can fulfill its proper function, such as triggering one or more airbags.

The arrangement of the invention is of substantial advantage, particularly when the headlamp shell and the protective plate are made of aluminum or an aluminum alloy. Welded connections of steel or steel alloys generally can withstand shear forces in the event of a crash. However, these shear forces cannot be absorbed by the welded connections of aluminum or aluminum alloys. The additional positively interlocking elements of the subject invention, in combination with the firm connection between the protective plate and the headlamp shell, ensure that the connection between the protective plate and the headlamp shell can withstand the shear forces that act in the connecting plane of the protective plate and are introduced in the X or Y direction.

The firm connection between the protective plate and the headlamp shell preferably is achieved by spot connections, such as clinched connections. Clinched connections are produced by deforming two sheet metal layers and provide clean, strong joining points that can take relatively high loads.

Four spot connections preferably are provided and preferably are arranged to form a rectangle. The hole in the headlamp shell for the blind rivet bolt preferably is located inside the rectangle. The recess or the projection on the headlamp shell preferably is not outside the rectangle. The spot connections accordingly are arranged relatively far out on the protective plate. However, the positively interlocking connections are produced in the areas of the protective plate and the headlamp shell that are closer to the center of the rectangle. The arrangement of the spot connections ensures that the protective plate is connected to the headlamp shell over a large surface area.

The headlamp shell preferably is made of sheet metal to facilitate clinched connections between the headlamp shell and the protective plate. The protective plate and the headlamp shell preferably are connected together in the area of a largely flat section of the headlamp shell. In the event of a crash the shear forces from the headlamp shell therefore are introduced into the protective plate in this plane.

The protective plate preferably is cap-shaped and has a roof section connected to the headlamp shell in the area of a base section of the headlamp shell. The sensor is arranged inside the cap-shaped component of the protective plate. Thus is fastened at least by the blind rivet bolt. The threaded section of the blind rivet bolt passes through a hole in the sensor and a nut is screwed onto the threaded section to fasten the sensor to the protective plate.

Without being restricted to this, a preferred exemplary embodiment of the invention will be explained in more detail below with reference to the drawings.

DETAILED DESCRIPTION OF THE PREFERRED EMBODIMENT

Figure 1:
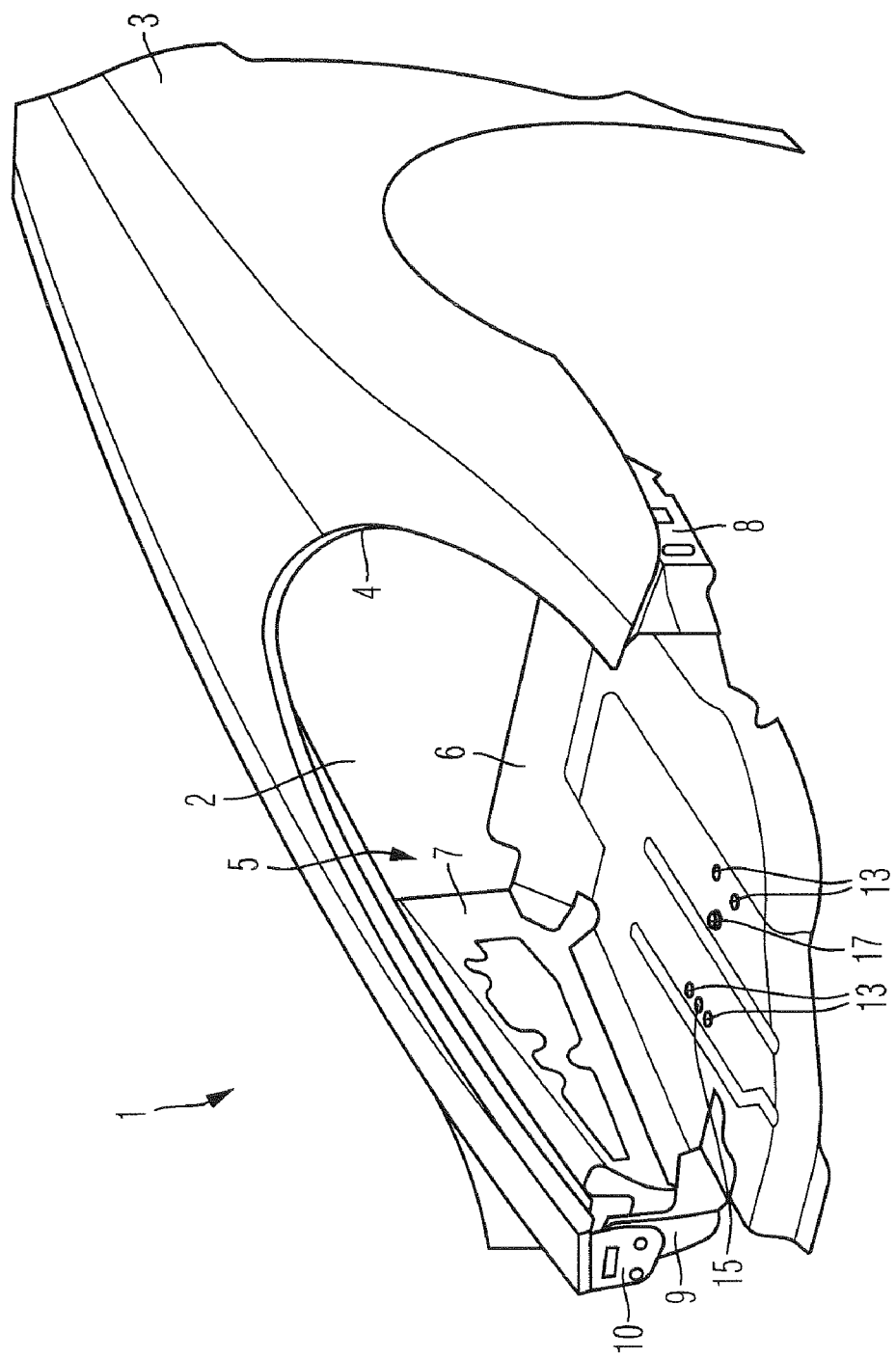
FIG. 1 is a perspective view of a sub-assembly for mounting a headlamp in the area of a recess in a wing of a passenger car, the headlamp shell being viewed obliquely from above, with the protective plate and sensor concealed below the headlamp shell.
Figure 2:
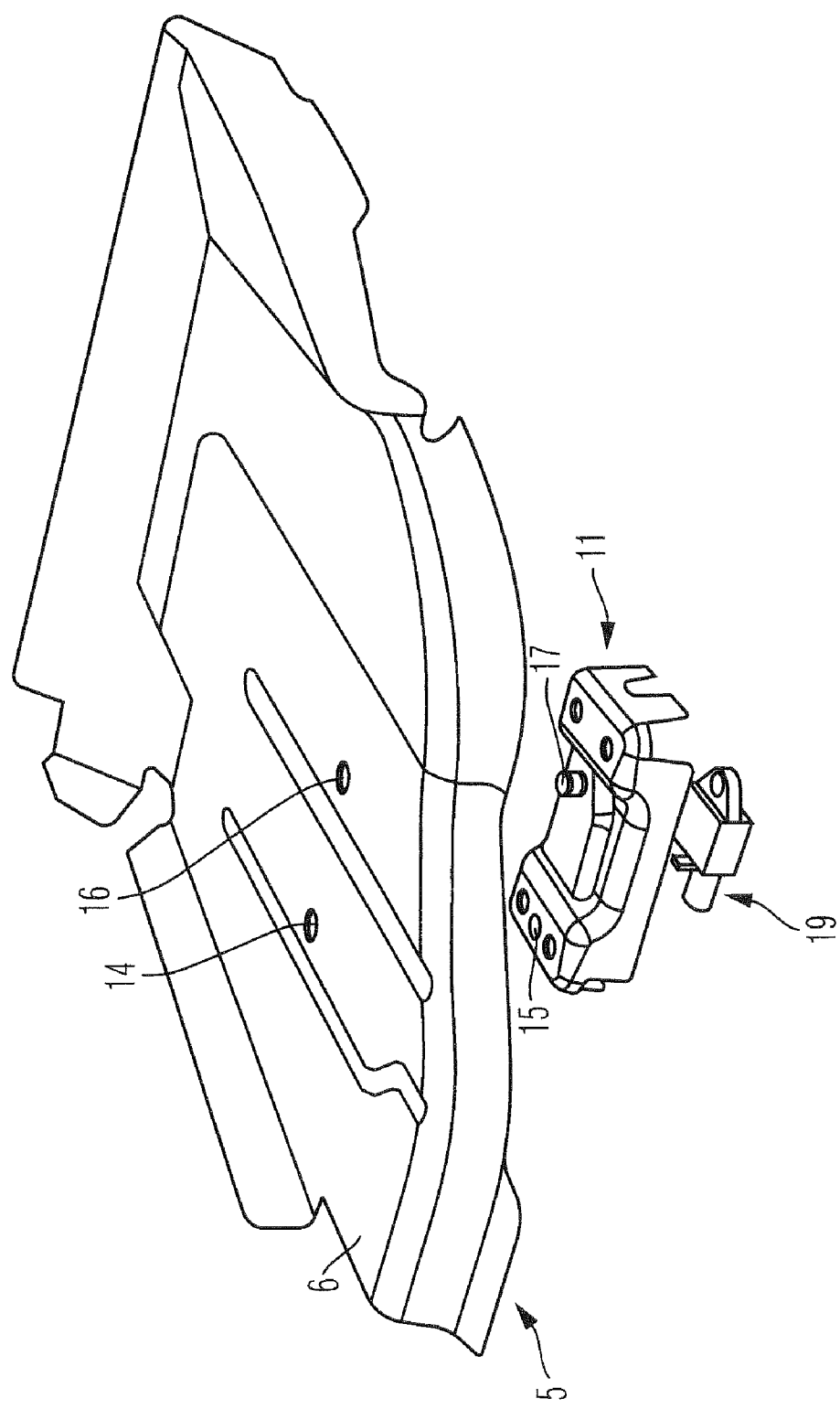
FIG. 2 is a perspective a view of the headlamp shell shown in FIG. 1, viewed obliquely from above, with the protective plate and the sensor prior to fitting of the sensor and the protective plate.

FIG. 1 shows the sub-assembly 1 for mounting a headlamp (not shown) in the area of a recess 2 in a wing 3 of a passenger car. The sub-assembly 1 is viewed obliquely from the front, relative to the orientation of the motor vehicle. The sub-assembly 1 accommodates the front, left headlamp of the vehicle. An upper area of the recess 2 defines an edge 4 in the wing 3. The edge 4 extends approximately over a part of an oval. The contour of the edge 4 corresponds to the contour of an upper area of the headlamp in its fitted state when mounted in the sub-assembly 1. Therefore the headlamp terminates flush with the wing 3 in the area of the edge 4, toward the visible outer side.

A headlamp shell 5 is connected by clinching to a front area of the wing 3. The headlamp shell 5 has a base 6 arranged largely horizontally relative to the usual orientation of the vehicle and a reinforcement 7 is arranged perpendicular to the base 6. The base 6 and the reinforcement 7 are aluminum plates and are connected together by clinching. The reinforcement 7 is connected by clinching to an area of the wing 3 adjacent the bonnet of the vehicle. The base 6 is connected by clinching to a butt plate 8 of the wing 3 in the area associated with the outside of the vehicle. A further reinforcing component 9 is connected by clinching to a front butt plate 10 of the wing 3 and to the base 6 of the headlamp shell 5. The reinforcing component 9 is adjacent to the reinforcement 7 in the front area of the wing 3.

A cap-shaped downwardly-open protective plate 11 is connected firmly to the base 6 of the headlamp shell 5. The protective plate 11 has a substantially planar roof section 12 that bears on a substantially planar partial section of the base 6 of the headlamp shell 5. The roof section 12 is substantially rectangular. Corner areas of the roof section 12 the protective plate 11 are connected firmly to the base 6 of the headlamp shell 5 by four clinched connections 13.

The base section 6 of the headlamp shell 5 has a hole 14 between the two clinched connections 13 that are adjacent to the reinforcement 7. The protective plate 11 has a boss or projection 15 that protrudes into the hole 14. The base section 6 of the headlamp shell 5 has a further hole 16 more closely adjacent to the other of two clinched connections 13, and a bolt head 17 of a blind rivet bolt 18 passes through the hole 16. A narrow annular gap remains between the bolt head 17 and the hole 16.

The blind rivet bolt 18 is riveted to the roof section 12 of the protective plate 11 and serves to fasten a sensor 19 to the protective plate 11. The sensor 19 is in the form of a crash sensor for triggering an airbag. The sensor 19 has a housing 20 with a hole that receives the threaded section 21 of the blind rivet bolt 18, and a nut 22 is screwed onto the threaded section 21 to fasten the sensor 19.

Figure 3:
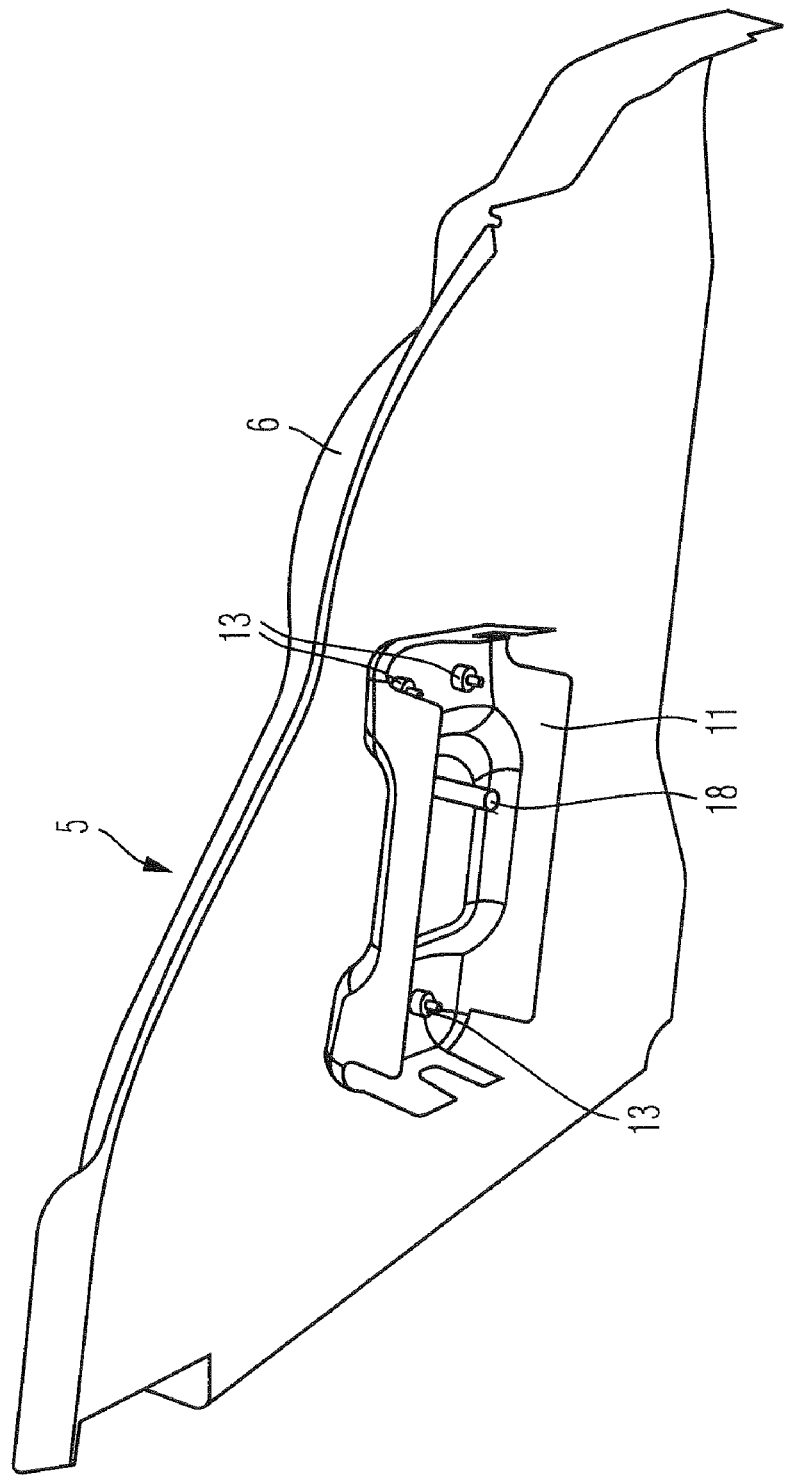
FIG. 3 is a perspective view of the headlamp shell and the protective plate after connecting the protective plate to the headlamp shell and fitting the blind rivet bolt.
Figure 4:
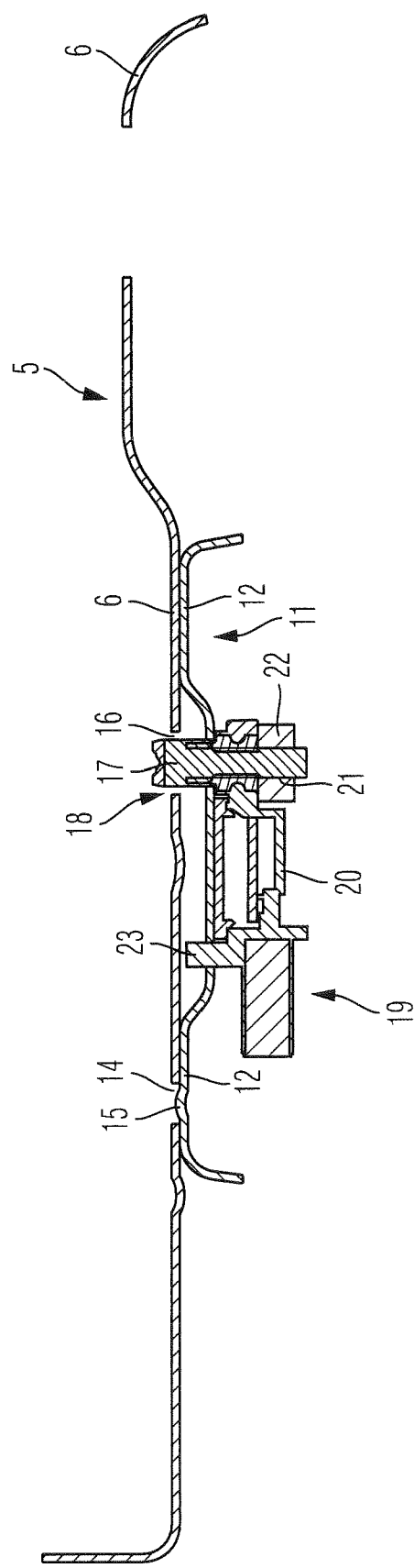
FIG. 4 is a cross-sectional view of the arrangement shown in FIG. 3, with the addition of the sensor fastened to the protective plate.

The protective plate 11 and the blind rivet bolt 18 riveted to the protective plate 11 are positioned on the underside of the headlamp shell 5. More particularly, the bolt head 17 of the blind rivet bolt 18 is inserted into the hole 16 and the projection 15 on the protective plate 11 protrudes into the hole 14 in the headlamp shell 5. Thus, the protective plate 11 is positioned precisely in relation to the headlamp shell 5. The four clinched connections 13 then are produced, as illustrated in FIG. 3. The sensor 19 then is connected to the protective plate 11. Specifically, the sensor 19 is pushed on to the threaded section 21 of the blind rivet bolt 18, and simultaneously a projection 23 on the housing 20 of the sensor 19 is inserted into a hole in the protective plate 11. The nut 22 then is screwed on to the threaded section 21 to complete the connection of the sensor 19 to the protective plate 11.

The connection described for mounting the protective plate 11 together with the sensor 19 in the headlamp shell 5 is eminently suitable for a headlamp shell sheet metal part and a protective plate made of aluminum or an aluminum alloy. In the event of a crash the connection ensures that shear forces acting perpendicular to the longitudinal axis of the blind rivet bolt 18, between the base 6 of the headlamp shell 5 and the roof section 12 of the protective plate 11, are absorbed via the clinched connections 13 and also are absorbed under slight deformation of the base 6 and the roof section 12 via the positive interlock between the bolt head 17 of the blind rivet bolt 18 and the base 6 and/or between the projection 15 of the roof section 12 and the base 6. In the event of a crash this is sufficient, at least at the beginning of the crash sequence, to ensure a secure connection of the sensor 19, the protective plate 11 and the headlamp shell 5, with the result that the sensor 19 can trigger reliably.

What is claimed is:

1. A sensor mounting arrangement for a vehicle, comprising:
    a headlamp shell formed with a recess and a hole spaced from the recess;
    a protective plate engaged with the headlamp shell and having a projection that protrudes into the recess of the headlamp shell;
    a blind rivet bolt riveted to the protective plate at a location spaced from the projection of the protective plate, the blind rivet bolt having a shank and a bolt head that passes through the hole in the headlamp shell; and
    a sensor connected firmly to the shank of the blind rivet bolt and to the protective plate.

2. The arrangement of claim 1, wherein the headlamp shell and the protective plate are made of aluminum or an aluminum alloy.

3. The arrangement of claim 1, wherein the projection of the protective plate is a boss, and the recess of the headlamp shell is a through hole.

4. The arrangement of claim 1, wherein the headlamp shell is a metal sheet.

5. The arrangement of claim 4, wherein the protective plate and the headlamp shell are connected together in an area of a substantially flat section of the headlamp shell.

6. The arrangement of claim 5, wherein the protective plate and the headlamp shell are firmly connected by clinched connections.

7. The arrangement of claim 6, wherein four clinched connections are provided and are arranged to form a rectangle.

8. The arrangement of claim 7, wherein the hole in the headlamp shell for the blind rivet bolt is located inside the rectangle and the recess on the headlamp shell is not arranged outside the rectangle.

9. The arrangement of claim 1, wherein the protective plate is cap-shaped and has a roof section connected to the headlamp shell in an area of a base of the headlamp shell.

10. The arrangement of claim 1, wherein the shank of the blind rivet bolt is threaded, the arrangement further comprising a nut threaded to the shank for securely connecting the sensor to the protective plate.

11. A sensor mounting arrangement for a vehicle, comprising:
- a headlamp shell formed from aluminum or an aluminum alloy and having a recess and a hole spaced from the recess;
- a protective plate formed from aluminum or an aluminum alloy and having a projection that protrudes into the recess of the headlamp shell, the protective plate being connected to the headlamp shell at a plurality of spaced apart clinch connections disposed so that the projection is not outside an area bounded by the clinch connections;
- a blind rivet bolt riveted to the protective plate at a location spaced from the projection of the protective plate and within the area bounded by the clinch connections, the blind rivet bolt having a threaded shank and a bolt head that passes through the hole in the headlamp shell;
- a crash sensor mounted on the threaded shank of the blind rivet bolt; and
- a nut threaded on the shank of the blind rivet bolt and securely connecting the crash sensor to the protective plate.

12. The arrangement of claim 11, wherein the protective plate and the headlamp shell are connected together in an area of a substantially flat section of the headlamp shell.

13. The arrangement of claim 11, wherein four clinched connections are provided and are arranged to form a rectangle.

14. The arrangement of claim 11, wherein the protective plate is cap-shaped and has a roof section connected to the headlamp shell in an area of a base of the headlamp shell.

* * * * *